March 31, 1959  E. F. SMALL  2,879,954
FISHING REEL
Filed June 27, 1956  2 Sheets-Sheet 2
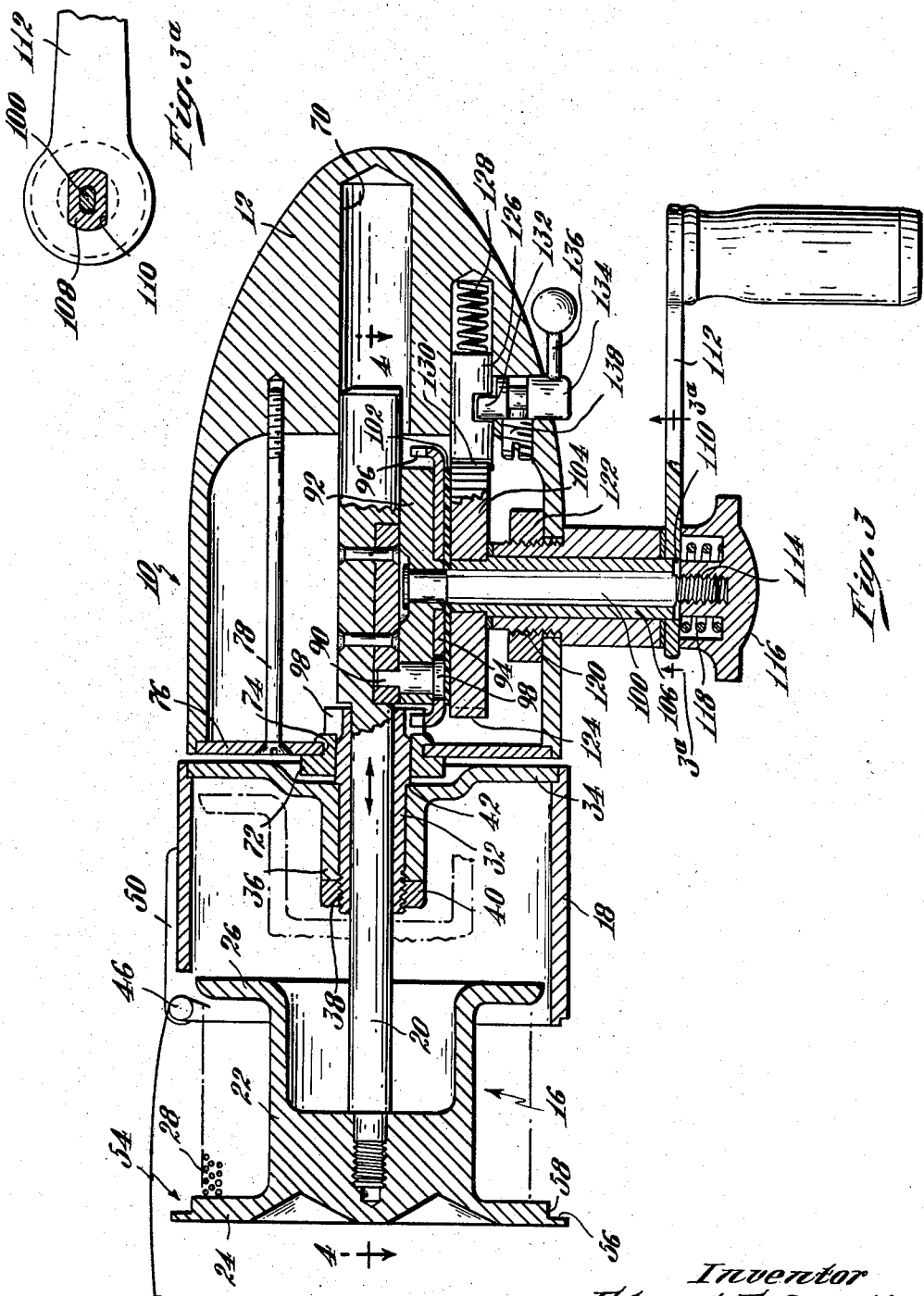
Inventor
Edward F. Small
by Roberts, Cushman & Grover
Att'ys

United States Patent Office 2,879,954
Patented Mar. 31, 1959

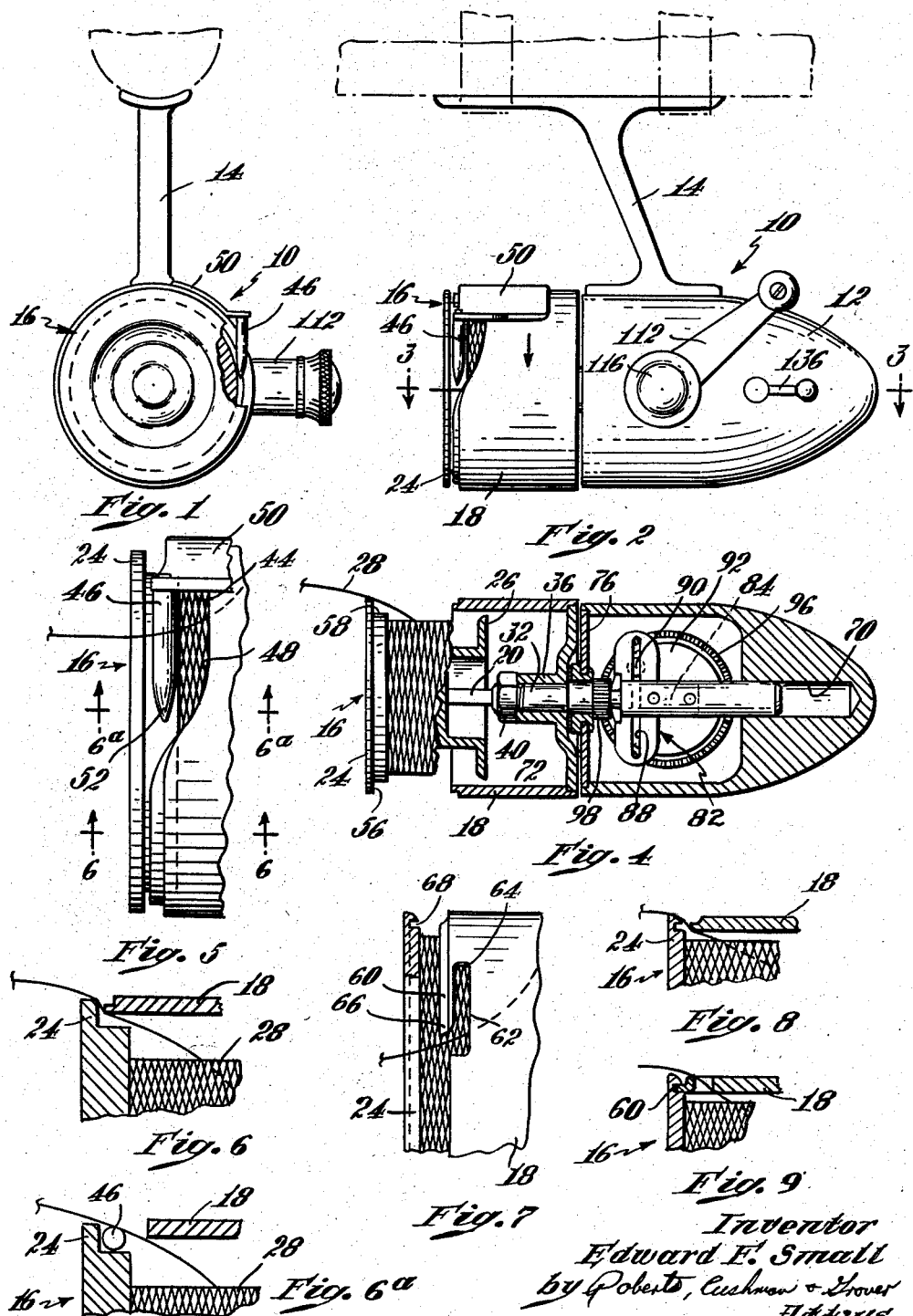

2,879,954
FISHING REEL
Edward F. Small, Newton, Mass.

Application June 27, 1956, Serial No. 594,260

6 Claims. (Cl. 242—84.21)

This invention relates to fishing reels and more especially to reels of the kind commonly known as "spinning reels."

Objects of this invention are to provide a reel of the kind in which the spool is disposed axially so that the line runs off its forward end, with means which will automatically pick-up the line on rewind which does not embody a finger or bail which must be manually moved to an out-of-the-way position preparatory to casting or other mechanism whirling about during returning of the line which might entangle it. Other objects are to provide a reel with pick-up means which will always be in readiness for picking up the line when the rewind handle is turned to effect rewinding without manipulation to put it into operative position; which will positively engage the line within the length of a few coils; and which will hold the line until the latter is released from it and yet will not entrain or catch the line accidentally during casting. Other objects are to provide a reel with means for applying drag to the line after a strike which is in such a position as not to interfere with the running line; and which includes means for traversing the line during drag so that it unwinds substantially tangentially of the spool and conversely rewinds tangentially of the spool. Another object is to provide a reel which has means for locking the rewind handle during drag so that it does not spin. Other objects are to provide a compact reel which has a high capacity spool that is, one which will accommodate a much greater length of line than the usual spool so that at the end of the cast there will be a surplus of line available to permit play if a strike is made at the moment the lure drops and to provide a spool from which the line may be paid off at a low angle so as to minimize friction during the casting. Still other objects are to provide a reel which is durable, has comparatively few parts, requires but little lubrication and is dependable in operation.

The invention will now be described in greater detail with reference to the accompanying drawings wherein:

Fig. 1 is an end view of the forward end of the reel with a portion broken away to show the pick-up finger;

Fig. 2 is a side elevation of the reel shown in Fig. 1, as seen from the right-hand side of Fig. 1;

Fig. 3 is an enlarged horizontal section through the reel from front to back taken on the line 3—3 of Fig. 2;

Fig. 3a is a vertical section taken on the line 3a—3a of Fig. 3;

Fig. 4 is a horizontal section from front to back taken on the line 4—4 of Fig. 3;

Fig. 5 is an enlarged elevation of the forward end of the reel showing the pick-up finger adjacent the forward flange of the spool just after it has picked up the line;

Fig. 6 is a fragmentary section taken on the line 6—6 of Fig. 5, showing the path of the line when the forward end of the flange is adjacent the forward end of the spool;

Fig. 6a is a fragmentary section taken on the line 6a—6a of Fig. 5 showing the relation of the leading end of the pick-up finger with respect to the groove in the forward flange of the spool and the line crossing the groove;

Fig. 7 is an elevation partly in section of a modified form of pick-up finger;

Fig. 8 is a fragmentary vertical section of Fig. 7 just before the line is picked up by the finger; and Fig. 9 is a similar section after the finger has picked up the line.

Referring more particularly to the drawings, the reel 10 (Fig. 1) has a hollow body or housing 12, a supporting post or arm 14, a spool 16 and a flyer 18. The arm 14 is attached at one end of the body and has at its opposite end forwardly and rearwardly extending concave flanges for engagement with a fishing rod to which they are secured by conventional slides or sleeves on the rod so as to support the reel in suspension from the underside of the rod (Figs. 3 and 4).

The spool 16 and flyer 18 are mounted on the body as will subsequently appear for relative movement with respect to each other. The spool is fast to a shaft 20 which extends rearwardly therefrom into the housing 12 and has a cylindrical barrel 22, at the forward and rear ends of which are radially extending flanges 24 and 26. The groove between the flanges affords room for storage of coils of line 28, which as will appear hereinafter runs freely off the forward end of the spool during casting and is returned to the groove in the spool by level winding means. As illustrated the spool is axially quite long and its groove comparatively shallow. The extra axial length of the spool provides capacity for enough line to permit a maximum cast with an excess of line remaining on the spool after the cast is completed thus to allow play in the event that a strike is made at the end of the cast.

The flyer 18 comprising a hollow cylindrical shell is mounted on a sleeve 32 concentric with the spool shaft 20. The flyer shell is closed at its rear end by a diametrically extending wall 34, at the center of which there is an integral axially extending hub 36 of such size as to fit over the forward end of the sleeve 32, the latter being threaded at 38 to receive a nut 40 for securing the flyer in place. The sleeve 32 has a radial shoulder 42 against which the rear end of the hub 36 is jammed by the nut 40 so that the flyer is fixed to the sleeve and will rotate therewith when the latter is turned, as will appear hereinafter.

The spool and flyer are relatively movable, the spool being non-rotatably reciprocal axially of its length and parallel to the axis of the rod to which the reel is attached and the flyer being non-reciprocably rotatable about the axis of the spool so that the spool moves axially into and out of the flyer as the latter rotates about it, as will now appear.

During casting the line 28 runs freely over the forward end of the spool 16 (Fig. 4) and due to the fact that the line groove is shallow the angle at which the line passes over the forward flange of the spool is comparatively low so that a minimum frictional resistance is offered to free movement of the line thus making it possible to attain maximum casting distances. This is further augmented by the fact that there are no rotating parts or guide eyes resisting movement of the line.

To take up the line that is, rewind it, the wall of the flyer near its forward edge is provided with a recess 44 across which extends a rewind finger 46 (Figs. 1, 2 and 5). The recess extends axially inward and peripherally its rear side being defined by a curved wall 48 (Fig. 5). The finger 46 is mounted opposite the wall 48 on a bracket 50 fastened to the surface of the flyer and has a conical or pointed tip 52 pointing in the direction of rotation of the flyer, the axis of which is approximately at right angles to the axis of rotation of the flyer and inclined downwardly for a reason that will appear hereafter. The outer side of the finger is substantially flush with the plane of the forward edge or rim of the flyer. The tip of the finger terminates short of the forward end of the recess so as to provide an opening or inlet into the recess 44 behind the finger, the latter providing a trap for the line after it enters the recess, as will now appear.

In order to insure picking up the line automatically without having to lift it manually into place, the forward flange 24 of the spool has at its rear side next to its perimeter an annular groove 54 which provides vertical and horizontal shoulders 56 and 58, the latter being of smaller diameter than the inside diameter of the flyer. When the spool is drawn inwardly by the reciprocal movement provided the flange 24 confines the line, between it and the edge of the flyer as shown in Fig. 6. Since the shoulder is of smaller diameter than the inside diameter of the flyer the line is bent downwardly across the groove in the flange 24 leaving a space beneath the line which is bounded on its outer side by the vertical shoulder 56 and on its bottom side by the shoulder 58. The groove 54 provides a circular path beneath the line along which the downwardly sloping point of the finger moves as the flyer rotates in a circle below the course of the line. As the inlet to the recess 44 in the flyer and the confined line come opposite to each other due to the rotation of the flyer the line snaps outwardly and rearwardly into the recess and is trapped therein behind the finger. Engagement is insured both by the tendency of the confined line which is deformed by the edge of the flyer to straighten out and by reason of the pull on the line.

The construction shown in Figs. 1 to 6 for the pick-up finger is preferred, however, pick-up may be effected by the alternative construction shown in Figs. 7 to 9 inclusive. In this form a finger 60 is provided which is an integral part of the forward edge of the flyer wall and is formed by cutting away a part of the wall of the flyer inwardly from its forward edge and then peripherally to provide a wall 62 parallel to the edge of the flyer. Between the finger and the wall 62 there is a recess or notch 64. As in the previous case the tip 66 of the finger 60 points in the direction of rotation of the flyer. The inner face of the flange 24 has an annular groove 68 adjacent its edge within which the forward side of the finger travels, which as shown, projects axially beyond the forward edge of the flyer by a small amount. As the flyer and spool move toward each other a portion of the line is confined between the flange 24 and the edge of the flyer as shown in Fig. 8, so that it is drawn down at an angle across the periphery of the flange 24 to the surface of the coil on the spool. Since the finger 60 projects axially beyond the edge of the flyer it travels in the groove 68 beneath the curve of the inclined line. As in the previous instance as soon as the line reaches the entrance to the recess 64 it is released rearwardly into the recess behind the finger and is threafter carried in rotation by the flyer for rewinding of the line.

The shaft 20 and sleeve 36 are supported for reciprocation and rotation respectively in the housing 12 by bearings 70 and 72 the former being constituted by a hole in the rear wall of the housing and the latter by a ring 74 fixed in a plate 76 fastened to the forward end of the housing by a screw 78. That part of the shaft within the housing is flattened and has in it a recess. A flat T-shaped plate 82 is fastened in the recess. The stem 84 coincides with the axis of the shaft and the plate 82 extends transversely thereof and has in it a transversely extending slot 88. An eccentric pin 90 (Figs. 3 and 4) fast to a peripheral portion of a disc 92 is engaged within the slot 88. The disc is arranged to be turned about an axis which lies in a plane passing through the axis of the shaft 20 and perpendicular thereto. Accordingly, rotation of the disc 92 will through the pin effect axial reciprocation of the shaft 20. A second disc 94 having peripherally arranged teeth 96 is mounted against the disc 92 for rotation therewith about the foregoing axis, and as illustrated herein is fixed so that it moves in unison with the disc 92 by the head 98 of the pin which is fixed in registering holes in the two discs. If desired the parts 92 and 94 may be integral and drilled to receive the pin 90. The teeth 96 mesh with teeth 98 formed on the inner end of the sleeve 32 a portion of it projects through the bearing ring 72 into the housing. Rotation of the disc 94 effects rotation of the sleeve 32 and hence rotation of the flyer 18. The axis about which the discs 92 and 94 rotate is provided by the inner end of a shaft 100 which extends horizontally from the shaft 20 through the side of the housing 12 and upon which the discs are free to turn. A friction disc 102 is also mounted on the shaft 100 between the outer surface of the disc 94 and a disc 104, the latter being fixed to the inner end of a sleeve 106 which surrounds the shaft 100 and also extends outwardly through the wall of the housing. The outer ends of the sleeve 106 have flats at opposite sides for engagement with a rectangular hole 110 in a handle 112 so that by turning the handle 112 the sleeve 106, shaft 100 and the disc 104 are turned. Rotation of the disc 104 is transmitted through the friction element 102 to the discs 94 and 92 so as to effect reciprocation and rotation of the spool and flyer respectively. The inner end of the shaft 100 has a head which bears against the inner side of the disc 92 and the outer extremity of the shaft 100 has threads 114 for receiving a hollow nut 116 which may be turned on the shaft 100 to draw the discs 92, 94 and 104 together against the opposite sides of the friction disc 102 thereby to increase or decrease the torque which may be transmitted without slip. Preferably a coiled spring 118 is seated within the hollow portion of the nut 116 so as to provide for adjusting the torque. To prevent unscrewing of the nut 116 a portion of the shaft 100 and sleeve 106 are made non-circular (Fig. 3a) so that they must turn in unison.

The sleeve 106 is supported where it passes through the wall of the housing by a nipple 120 which is threaded internally of the housing and is retained rigidly in place by a nut 122 at its inner threaded end.

The disc 104 has on its perimeter a plurality of teeth 124 (Fig. 3) and in the rear wall of the housing there is mounted a plunger 126 backed by a coiled spring 128 which has on its forward end a beveled tooth 130 for engagement with the teeth 124. The plunger is normally held retracted by an eccentric cam 132 engaged within a notch in the plunger which may be rotated to permit the plunger to move forwardly into engagement with the disc and to be held thereagainst by the spring 128 to act as a brake to prevent rotation of the handle in a backward direction and at the same time to hold the friction disc stationary so that it resists free rotation of the discs 92 and 94 and hence provides drag for the line by resisting rotation of the flyer, when the line is running out across the pick-up finger. The eccentric 132 has a grooved shaft 134, a portion of which projects from the wall of the housing and has fast to it a handle 136 for operating it. A set screw 138 threaded into the rear wall of the housing with its inner end seated in the groove holds the shaft in place. When the line has been picked up by rotating the flyer so that the line passes over the finger 52 or 60 as the case may be the eccentric cam 132 may be flipped over by turning the handle 136 to lock the disc 104 against backward rotation which will automatically lock the handle 112. Because of the friction disc 102 between the locked disc 104 and the discs 92 and 94 these latter members can turn irrespective of the fact that the handle 112 is locked against rotation but only in opposition to the frictional drag imparted by pressure of the friction disc between them and the disc 104. The resistance of these members to turning is, of course, controlled by the knob 116 and may be increased or decreased as desired by turning the knob to increase or decrease the friction.

The spool as previously stated is axially quite long hence when the line is being pulled off over the pick-up finger as when a fish is being played and a drag has been applied there would ordinarily be a tendency for the line to drag the uncoiling turns of the line axially of the spool if there were not some means for traversing the line axially of the spool as it unwound. This would become more and more pronounced as the line uncoiled further and further along the axis of the spool from the finger as the line came closer and closer to being substantially parallel to the axis of the spool. Ultimately the line would be substantially double on itself so that the pull on the line would have substantially no unwinding component of force and hence the flyer would tend to stall that is, the entire pull applied to the line would in effect be as if the line were anchored at one end. Under such conditions the line would be almost certain to break. With the aforesaid construction however when the handle 112 is locked and the line 28 is running over the finger 52 or 60 as the case may be the flyer will be caused to rotate by the pull on the line which in turn will reciprocate the spool hence traversing the line so that the line coming off the spool will always be substantially tangent to its surface and in the plane of the forward edge of the flyer. Thus the line is never parallel to the axis of the spool and the spool has no tendency to stall.

It should be understood that the present disclosure is for the purpose of illustration only and that this invention includes all modifications and equivalents which fall within the scope of the appended claims.

I claim:

1. In a fishing reel, means for attaching the reel to a rod, said means mounting a spool and a line winder concentrically for relative movement in reciprocation and rotation on an axis extending substantially in the direction of the axis of the rod, said spool having at its forward end a flange containing a groove at its inner side, near its periphery, and said winder having at its forward end an annular end, means for effecting relative movement of the spool and line winder toward each other to cause the end of the winder to enter the groove in the flange of the spool when taking the line onto the spool and away from each other when allowing the line to run free, said end operating to displace a portion of the line running over the flange into the groove as the end enters the groove, said end containing a recess therein into which the deflected portion of the line is adapted to spring when the recess reaches the place where the line runs over the flange, and means carried by the winder adjacent the recess behind which the line is caught and retained by relative movement of the spool and winder in a direction to take the line up on the spool.

2. A fishing reel according to claim 1, wherein the groove is located radially inward of the edge of the flange.

3. A fishing reel according to claim 1, wherein the groove has a radially disposed wall and an axially disposed wall, and the end of the winder has an end surface which parallels said radially disposed wall and an inner side which parallels said axially disposed wall.

4. A fishing reel according to claim 1, wherein the means for retaining the line is a finger situated substantially parallel to the plane of the annular end of the winder, extends from the trailing side of the recess with respect to the direction of rotation toward the leading side thereof and partially closes the recess.

5. A fishing reel according to claim 1, where the means for retaining the line is a finger situated with its axis substantially parallel to the plane of the annular end of the winder and substantially tangent to the bottom of the groove.

6. In a fishing reel, a spool, a cup-shaped line winder having a forwardly open annular end, means mounting the cup and spool concentrically with the spool within the winder cup for rotation of the winder cup about the axis of the spool and reciprocation of the spool axially of the winder cup, forwardly and rearwardly through the open forward end thereof, a flange at the forward end of the spool having a groove at its inner side near its peripheral edge, corresponding in diameter to the diameter of the annular end of the winder cup, means for effecting rotation of the cup and simultaneously reciprocating the spool to cause the annular end of the winder cup to enter the groove in the flange of the spool when the spool moves rearwardly into the cup so as to displace a portion of the line running over said flange, said annular end of the winder cup having an open recess in its edge into which the deflected portion of the line is adapted to spring when the recess reaches that place where the line runs over the flange, and a finger on the winder cup projecting part way across the recess in the direction of rotation of the winder cup when taking up the line, behind which the line is caught and retained by rotation of the winder cup.

References Cited in the file of this patent
UNITED STATES PATENTS

| | | |
|---|---|---|
| 2,613,882 | Small | Oct. 14, 1952 |
| 2,687,855 | Shakespeare et al. | Aug. 31, 1954 |
| 2,777,645 | Wood | Jan. 15, 1957 |